United States Patent [19]
Watanabe

[11] Patent Number: 5,081,221
[45] Date of Patent: Jan. 14, 1992

[54] CHIRAL SMECTIC C LIQUID CRYSTALLINE POLYESTER AND OPTICAL FILTER

[75] Inventor: Junji Watanabe, Yokohama, Japan
[73] Assignee: Nippon Oil Company, Limited, Tokyo, Japan
[21] Appl. No.: 240,953
[22] Filed: Sep. 6, 1988
[30] Foreign Application Priority Data Sep. 4, 1987 [JP] Japan ................. 62-220358

[51] Int. Cl.$^5$ ............... C08G 63/00; C09K 19/52
[52] U.S. Cl. ................... 528/308; 252/299.01; 252/299.66; 428/1; 359/104
[58] Field of Search ............. 252/299.01, 299.66; 428/1; 528/308; 350/350 S

[56] References Cited

U.S. PATENT DOCUMENTS

| | | | |
|---|---|---|---|
| 4,904,747 | 2/1990 | Morris et al. | 528/308 X |
| 4,933,243 | 6/1990 | Hara et al. | 428/1 X |

FOREIGN PATENT DOCUMENTS

| | | | |
|---|---|---|---|
| 308171 | 9/1988 | European Pat. Off. | 252/299.01 |
| 0292244 | 11/1988 | European Pat. Off. | |
| 306339 | 3/1989 | European Pat. Off. | 252/299.01 |
| 338845 | 10/1989 | European Pat. Off. | 252/582 |

OTHER PUBLICATIONS

Chiellini, E. et al., Macromolecules, 18, 1652, 1985.
Chiellini E. et al., Makromol. Chem. Rapid. Comm. 4, 285, 1983.
Chiellini, E. et al., Recent Adv. in Mechanistic and Synthetic Aspects of Polymerization, M. Fontanille et al. Eds. D. Reidel, 1987.
Chiellini, E. et al., Polymer Bulletin 9, 336, 1983.
Ober, C. et al., in Advances in Polymer Science 59 M. Gordon, ed., Springer-Verlag, Berlin, 1984, p. 103.
Dubois et al., Mol. Cryst. Liq. Cryst., 137, 349-364 (1986).
Shibaev et al., Polymer Bulletin, 12, 299-301 (1984).
Chapoy, "Recent Advances in Liquid Crystalline Polymers," Elsevier Applied Science Publishers, London and New York (1985) pp. 22-33.

Primary Examiner—John S. Maples
Assistant Examiner—Richard Treanor
Attorney, Agent, or Firm—Scully, Scott, Murphy & Presser

[57] ABSTRACT

Provided is a novel chiral smectic C liquid crystalline polyester consisting essentially of structural units (A), (B) and (C) of the following formulae:

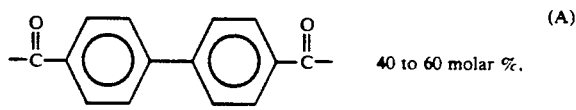

40 to 60 molar %. (A)

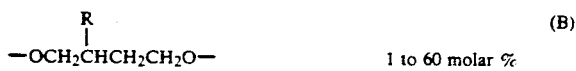

1 to 60 molar % (B)

which is optically active and wherein R represents an alkyl group having 1 to 3 carbon atoms, and

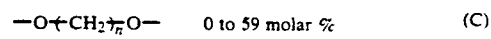

0 to 59 molar % (C)

wherein n represents an integer of 2 to 10.

5 Claims, 6 Drawing Sheets

K: SOLID PHASE
Sc*: CHIRAL SMECTIC PHASE
I: ISOTROPIC PHASE
Ch: CHOLESTERIC PHASE
SA: SMECTIC A PHASE

FIG. 1-a
POLYMER NO. 1

PPM from TMS

FIG. 1-b
POLYMER NO. 5

PPM from TMS

FIG. 1-c
POLYMER NO. 6

PPM from TMS

FIG. 1-d
POLYMER NO. 9

PPM from TMS

K: SOLID PHASE        Ch: CHOLESTERIC PHASE
Sc*: CHIRAL SMECTIC PHASE   SA: SMECTIC A PHASE
I: ISOTROPIC PHASE

1: ALUMINUM SPACER  2: POLYMER
3: GLASS

FIG 8

CHIRAL SMECTIC C LIQUID CRYSTALLINE POLYESTER AND OPTICAL FILTER

BACKGROUND OF THE INVENTION

The present invention relates to a new chiral smectic C liquid crystalline polyester having excellent mechanical strengths which can be melt-molded and which is suitable for use in the field of optoelectronics because it can selectively transmit light of a specific wavelength. The present invention relates also to an optical filter comprising the chiral smectic C liquid crystalline polyester.

Liquid crystals having a specific order of the molecular orientation peculiar to them are usable in various fields, taking advantage of their molecular orientation or by controlling it. The liquid crystals, therefore, form a great industrial field. As is well known, low-molecular liquid crystals of nematic type are widely used as display elements for watches, desk-top electronic calculators or televisions and they occupy an immovable position in the display field. Recently, chiral smectic C liquid crystals having characteristic features such as high-speed operation and memory function attract public attention as liquid crystals for the display elements of the next generation which will take the place of the above-described nematic ones. Under these circumstances, the competition for the development of them is now hot. The low-molecular liquid crystals are thus used mainly in virtue of their electrooptical effects. On the contrary, high-molecular liquid crystals are used mainly as mechanical materials in virtue of their high strength, high modulus and high heat resistance owing to the high molecular orientation in their liquid crystal structure. They were already put on the market under the names of Kevlar (a wholly aromatic polyamide; a product of du Pont, U.S.A.), Xydar (a wholly aromatic polyester; a product of Dartco, U.S.A.) and Vectra (a wholly aromatic polyester; a product of Celanese, U.S.A.).

It is well known that the high-molecular liquid crystals have electrooptical effects or thermooptical effects similar to those of the low-molecular liquid crystals depending on the types of them, i.e. nematic, smectic and cholesteric types, not to mention the excellent mechanical characters. The response of the high-molecular liquid crystals to an external force such as an electric field or heat is slower than that of the low-molecular ones because of a high viscosity of them and, therefore, the high-molecular ones cannot be used for the same purpose as that of the low-molecular ones. However, the orientation structure peculiar to the types of the high-molecular liquid crystals can be fixed and, accordingly, the optical characters peculiar to the respective structures can be fixed. This is a great characteristic feature of the high-molecular liquid crystals, which the low-molecular liquid crystals do not have. Attempts have been made at preparing optical elements in virtue of this characteristic feature. As for those made of high-molecular cholesteric liquid crystals, a visible light-reflecting polymer complex comprising a cholesteric liquid crystalline polypeptide fixed with an amorphous polymer, said polypeptide having a spiral pitch capable of selectively reflecting light of a wavelength in the visible light region, is disclosed in Japanese Patent Laid-Open No. 139506/1981.

Further, a notch filter made of a visible light-reflecting polymer complex prepared as described above is disclosed in Japanese Patent Laid-Open No. 191203/1985. However, these optical elements prepared by fixing the high-molecular cholesteric liquid crystals have the fixed character of the cholesteric liquid crystals, i.e. a character of selectively reflecting light of a special wavelength from the incident light. Accordingly, from the viewpoint of the transmitted light, most of the light other than the one reflected and cut is transmitted. This is a serious problem. This fact means that this filter cannot be used as a transmitting filter through which only light of a special wavelength is selectively transmitted. This limits the practical use of the filter to a narrow range.

When the high-molecular liquid crystals are shaped into a film or a thin film to prepare elements, the molecules usually orient in parallel with the film surface. In case of the cholesteric liquid crystals, the cholesteric layer is in parallel with the film surface. Therefore, in an incident light which is at a certain angle to the face, a part thereof of a special wavelength is selectively reflected depending on the cholesteric pitch. Namely, the optical elements prepared by fixing the high-molecular cholesteric liquid crystals are essentially selective reflection filters. Further chiral smectic C liquid crystals are known as liquid crystals having the same periodicity of the molecular orientation order as that of the cholesteric liquid crystals. In the chiral smectic C liquid crystals, the orientation vector of the smectic molecular layer is slowly twisted at a certain angle and, as a whole, the orientation vector has a certain spiral structure. Let a layer distance required for the orientation vector to make one revolution be one pitch, the liquid crystals have such a periodic structure that the pitch is the base unit. Therefore, the optical properties of the liquid crystals depend on the pitch. In the films or thin films of the chiral smectic C liquid crystals, the molecules are arranged in parallel with the face but the smectic C layer is, therefore, arranged perpendicularly to the face. This is an essential difference from the structure of the cholesteric liquid crystals. The incident light on the surface of the film is reflected by the chiral smectic C layer which is perpendicular to the film surface and then travels onto the other side of the film surface. As a result, the light of a special wavelength selectively passes through the film. Thus, a transmitting filter is obtained If a film or thin film comprising fixed high-molecular chiral smectic C crystals is produced on the basis of this principle, the film can be used as a transmitting filter which selectively transmit light of a particular wavelength. However, no polymer capable of forming a clear chiral smectic C liquid crystal phase which can be fixed has been known as yet. For example, J. C. Dubois et al. reported polyacrylic ester derivatives having a structure of the following formula in which the side chain has a mesogen containing a chiral unit [Mol. Cryst. Liq. Cryst., 137, 349 (1986)].

(n = 2, 6, 11, R = H, CH₃, Cl)

According to X-ray diffractometry of polymers of the above formula wherein R is H and n is 2, R is CH₃ and n is 11, or R is Cl and n is 11, Dubois et al. found that the polymers had a smectic layer structure and that the major axis of the mesogen of the side chain inclined to the normal. From these facts, they suggested that these polymers formed a phase which was supposed to be chiral smectic C within a certain temperature range. However, they were silent on the results of optical observation or pitch length. The formation of the chiral smectic C phase was thus not proved and no report dealing with the fixation was given. Further when the teaching of the report of Dubois et al. is to be actually practiced on an industrial scale, it has defects in that multiple steps are required for the production of the monomer having such a side chain to make the operation quite troublesome and that a high molecular weight cannot be obtained even when the monomer is subjected to the polymerization and a film formed from the polymer thus prepared from the monomer has only a poor strength. In addition, V. P. Shibaev et al. reported polyacrylic ester derivatives similar to those described above [Polymer Bulletin 12, 299 (1984)]:

wherein m represents a number of 6 to 12 and no definition is given to R, R₁ and R₂.

According to X-ray diffractometry, Shibaev et al. found that these derivatives had a smectic layer structure, that the major axis of the mesogen of the side chain inclined to the normal and that spontaneous polarization was observed. From these facts, they concluded that the polymers form a chiral smectic C liquid crystal phase. However, like the polymers of Dubois et al., the polymers of Shibaev et al. have defects when the teaching of their report is to be practiced on an industrial scale. The defects are, for example, that the production of the polymers is quite difficult and that the polymers having a high molecular weight cannot be easily obtained. These chiral smectic C liquid crystalline polymers of the polyacrylic acid derivative type are produced by introducing the low-molecular chiral smectic C liquid crystal as they are into the side chain thereof and, therefore, they can be regarded to be modified low-molecular liquid crystals. If high-molecular chiral smectic C liquid crystals of the main chain type containing a chiral component in the main chain can be produced, the above-described defects can be overcome and a material which can be fusion-molded and which has a high strength and a high industrial value can be obtained. Although the production of polyesters and polyamides containing a chiral component in the main chain thereof was reported, the products are mostly cholesteric liquid crystals. Further, although some processes for producing nematic and smectic liquid crystals are known, no products having a distinct chiral smectic C phase were reported yet at all [L. L. Chapoy, "Recent Advances in Liquid Crystalline Polymers", Elsevier Applied Science Publishers, London and New York, 1985, p. 28].

The inventors have noted chiral smectic C liquid crystalline polymers as suitable starting materials for optical elements which can selectively transmit light of a specific wavelength. After intensive investigations made for the purpose of finding polymers which are free from the defects of the above-described polyacrylic ester derivatives, which can be produced easily on an industrial scale and which satisfy the requirements that they are capable of forming a distinct chiral smectic C phase, that they can be easily fixed, that they can be fusion-molded and that they have sufficient mechanical strengths, the inventors have found that polyesters containing a particular mesogen and a particular chiral component form distinct chiral smectic C liquid crystals and solve the above-described problems.

SUMMARY OF THE INVENTION

Therefore, an object of the present invention is to overcome the defects of the prior art. In particular, the object of the present invention is to provide new chiral smectic C liquid crystalline polyesters which can selectively transmit light of a specific wavelength and, therefore, is usable in the field of optoelectronics and which can be fusion-molded and have excellent mechanical strengths.

Another object of the present invention is to provide an optical filter comprising the chiral smectic C liquid crystalline polyester.

The chiral smectic C liquid crystalline polyesters of the present invention consist essentially of the following structural units (A), (B) and (C):

40 to 60 molar %, (A)

1 to 60 molar %

(B)

which is optically active and wherein R represents an alkyl group having 1 to 3 carbon atoms, and 0 to 59 molar %    (C)

wherein n represents an integer of 2 to 10.

DETAILED DESCRIPTION OF THE INVENTION

In the polyesters of the present invention, the dicarboxylic acid unit constituting the polyester is the above-described unit (A) and the diol unit(s) is (are) the unit (B) and optionally the unit (C).

Now, the description will be made on the respective components constituting the polyester of the present invention. The unit (A) is an indispensable component which acts as a mesogen for exhibiting the liquid crystalline property. The unit (A) is derived from a biphenyl-4,4'-dicarboxylic acid or its derivative (such as a dialkyl ester, e.g. diethyl ester). The amount of the unit (A) is 40 to 60 molar %, preferably 45 to 55 molar % and particularly substantially 50 molar % based on the polymer. The unit (B) is an indispensable component which acts as an optically active component for the polyester of the present invention to form the chiral smectic C liquid crystal phase. The unit (B) is derived from optically active 2-methyl-1,4-butanediol, 2-ethyl-1,4-butanediol, 2-propyl-1,4-butanediol or a derivative thereof (such as a diacetylated compound).

The butanediol used may be an R-isomer, an S-isomer or a mixture of them. When the mixture is used, the difference in amount between them must be at least 1%, preferably at least 10% and particularly at least 20%. When the difference between the R-isomer content and S-isomer content is less than 1%, the temperature range in which the chiral smectic C phase is formed is narrow unfavorably. The amount of the unit (B) is preferably 1 to 60 molar %, particularly 10 to 50 molar %. When the amount of the unit (B) is less than 1 molar %, the temperature range in which the chiral smectic C phase is formed is narrow unfavorably. The unit (C) is a component which controls the transition temperature, temperature range and viscosity in the formation of the chiral smectic C phase from the polyester of the present invention. The variety and the amount of the unit (C) can be selected depending on the physical properties of the intended polymer. Although the amount of the unit (C) can be suitably selected depending on the purpose in the range of 0 to 59 molar %, it is preferably 5 to 50 molar % from the viewpoint of controlling the physical properties. n in the above formula is an integer of 2 to 10, particularly preferably 4 to 8. When n is 1 or larger than 10, the liquid crystals are not formed in some cases. The unit (C) is derived from a corresponding α,ω-diol or its derivative (such as a diacetylated compound).

The processes for producing the chiral smectic C liquid crystalline polyesters of the present invention are not particularly limited. They can be produced by a conventional melt polycondensation or solution polycondensation process. For example, the melt polycondensation is conducted by polycondensing given amounts of diethyl biphenyl-4,4'-dicarboxylate, an optically active 2-alkyl-1,4-butanediol and an α,ω-alkanediol at a high temperature (for example, 150° to 300° C.) in an inert gas atmosphere or high vacuum. The ratio of the amounts of the monomers is selected so that the total of the acid components is almost equimolar to that of the diol components. The molecular weight can be easily controlled by controlling the polymerization time. To accelerate the transesterification and polycondensation, known polyester-forming catalysts such as alkali metal salts and metal salts, e.g. Fe, Mn, Cd, Mg, Ba, Ti, Zn, Pb, Co, Sb or Sn salts can be used either singly or in combination of two or more of them. A phosphorus compound may be used as a decomposition inhibitor.

Now, the description will be made on the process for producing optical filters from the chiral smectic C liquid crystalline polyester produced as described above. The polyester of the present invention can be used as the optical element in the form of plate, sheet or film. A process for producing the optical element will be described below with reference to an example wherein the polyester is in film form. The film of the chiral smectic C liquid crystalline polyester of the present invention can be produced by various processes employed in this technical field. In this process, the polymer is kept in a molten state at a high temperature. After thus keeping the polymer in a temperature range in which it is in the chiral smectic C phase for a certain period of time, a shearing force is applied to the polymer to orient the molecules in parallel with the film surface. Then, the sufficiently oriented chiral smectic C phase is fixed by cooling. It is apparent from FIG. 5 that the polyester of the present invention is in the cholesteric or smectic phase in a temperature range higher than that in which it is in the chiral smectic C phase. When the polyester is kept in a temperature range in which it is in the cholesteric or smectic A phase, the temperature is then lowered to age it in the chiral smectic C phase, a shearing force is applied to the polymer to orient the molecules in parallel with the film surface and finally it is cooled to fix the sufficiently oriented chiral smectic C phase. The cooling rate varies depending on the temperature range for the chiral smectic C phase. Namely, the cooling rate varies depending on the optically active component content. However, since the temperature range in which the polyester of the present invention is in the chiral smectic C phase is quite wide, the chiral smectic C liquid crystal structure can be easily fixed by leaving the film surface to cool without requiring any special operation. The easy fixation is one of the great characteristic features of the present invention. Other characteristic features of the present invention are that the film can be easily produced, that the film has a high strength because it comprises the polyester and that a filter having a large area can therefore be easily produced.

The film thus produced is usable as a filter permeable to light of a selected wavelength by cutting or molding according to the purpose or it is usable also as an optical device by combining it with another optical element. The optical filter of the present invention having a high accuracy can be produced easily at a low cost and is suitable for use in the fields of optics and optoelectronics. The optical filter of the present invention has thus an extremely high industrial value. The chiral smectic C liquid crystal polyester of the present invention has a very beautiful color when the pitch thereof is in the visible ray region and is, therefore, usable as a material for decorations and fashionable articles.

Further, since the polyester of the present invention is a chiral smectic C liquid crystal, it is ferroelectric and is usable for various purposes in virtue of its ferroelectricity.

The new chiral smectic C liquid crystalline polyester of the present invention is in the stable chiral smectic C phase over a wide composition range and a wide temperature range and it can be easily fixed. Since it can be easily shaped into a film of a high strength, the film of the fixed chiral smectic C phase can be easily produced. The film can selectively transmit light of a specific wavelength and, therefore, it is usable as an optical filter suitable for various applications in the fields of optics and optoelectronics.

EXAMPLES

The following Examples will further illustrate the present invention, which by no means limit the invention. The analytical methods employed in the following Examples are as follows:

(1) Determination of the composition:

The polymer was dissolved in deuterated trifluoroacetic acid and the composition thereof was determined by $^1$H-NMR (JNM-GX 400; a product of JEOL, Ltd.; 400 MHz) or $^1$H-NMR (MSL=300; a product of Bruker; 300 MHz).

(2) Determination of limiting viscosity number:

The limiting viscosity number was determined with an Ubbelohde's viscometer in a solvent mixture of phenol with tetrafluoroethane (volume ratio: 60/40) at 25° C.

(3) Determination of DSC:

DSC was determined with a Perkin-Elmer DSC-II calorimeter.

(4) X-ray diffractometry:

An X-ray generator (a product of Rigaku Denki Co.) was used in taking the pictures.

(5) Determination of transmission spectrum:

The transmission spectrum was determined with a spectrophotometric device.

EXAMPLE 1

(1) Production of chiral smectic C liquid crystalline polyester 5.96 g of diethyl biphenyl-4,4'-dicarboxylate, 3.32 g of (S)-2-methyl-1,4-butanediol (enantiotropic excess (e.e.)=93%) and two drops of tetrabutoxytitanium were placed in a reactor provided with a stirrer. After purging with nitrogen gas, the reaction was conducted at 185° C. in nitrogen stream for 45 min. The reaction was continued at 205° C. for 10 min, then at 225° C. for 10 min and finally at 250° C. for 20 min to give a polymer (Polymer No. 1 in Table 1).

Then 5.96 g of diethyl biphenyl-4,4'-dicarboxylate, 1.66 g of (S)-2-methyl-1,4-butanediol, 1.89 g of 1,6-hexanediol and two drops of tetrabutoxytitanium were subjected to the reaction at 185° C. for 45 min, at 205° C. for 10 min, at 225° C. for 10 min and finally at 250° C. for 20 min. Then the reaction was continued at 250° C. under a vacuum as high as 0.3 mmHg for one hour to give a polymer (Polymer No. 5 in Table 1).

Various polymers shown in Table 1 were prepared in the same manner as above except that the kinds of the monomers and the proportion of the materials were altered and the molecular weight was adjusted by controlling the reaction conditions.

The compositions and $[\eta]$ of the polymers thus obtained are shown in Table 1. The $^1$H-NMR spectra of Polymer Nos. 1, 5, 6 and 9 among them are shown in FIG. 1.

TABLE 1

Results of production of chiral smectic C liquid crystalline polyesters

| Polymer No. | Unit A | Unit B Note 1) | Unit C | A:B:C | $[\eta]$ (dl/g) |
|---|---|---|---|---|---|
| 1 | -C(=O)-C₆H₄-C₆H₄-C(=O)- | -O-CH₂-CH(CH₃)-CH₂-CH₂O- | — | 50:50:0 | 0.41 |
| 2 | " | " | -O+CH₂+₆O- | 50:45:5 | 0.91 |
| 3 | " | " | " | 51:39:10 | 0.62 |
| 4 | " | " | " | 52:23:25 | 0.33 |
| 5 | " | " | " | 50:25:25 | 1.03 |
| 6 | " | " | " | 52:11:37 | 0.30 |
| 7 | " | " | " | 50:3:47 | 0.63 |
| 8 | " | " | — | 50:50:0 | 0.39 |
| 9 | " | " | -O+CH₂+₇O- | 53:28:19 | 0.28 |
| 10 | " | -OCH₂CH(C₂H₅)CH₂CH₂O- | -O+CH₂+₈O- | 50:25:25 | 0.71 |
| 11 | " | -OCH₂CH(C₃H₇)CH₂CH₂O- | -O+CH₂+₆O- | 50:24:26 | 0.41 |

Note 1)
The e.e. of the 2-alkyl-1,4-butanediols from which the units (B) were derived were 93% (Polymer Nos. 1 to 7), 30% (No. 8), 90% (No. 9), 26% (No. 10) and 35% (No. 11).

(2) Identification of chiral smectic C structure

① X-ray diffractometry

Figure 1A:
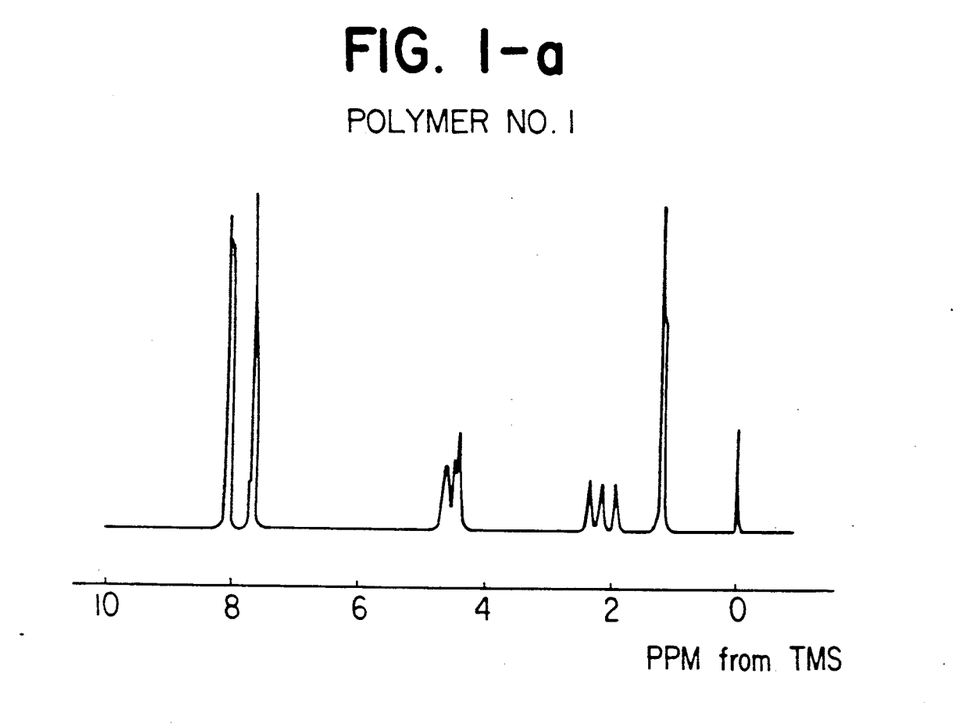
Figure 1B:
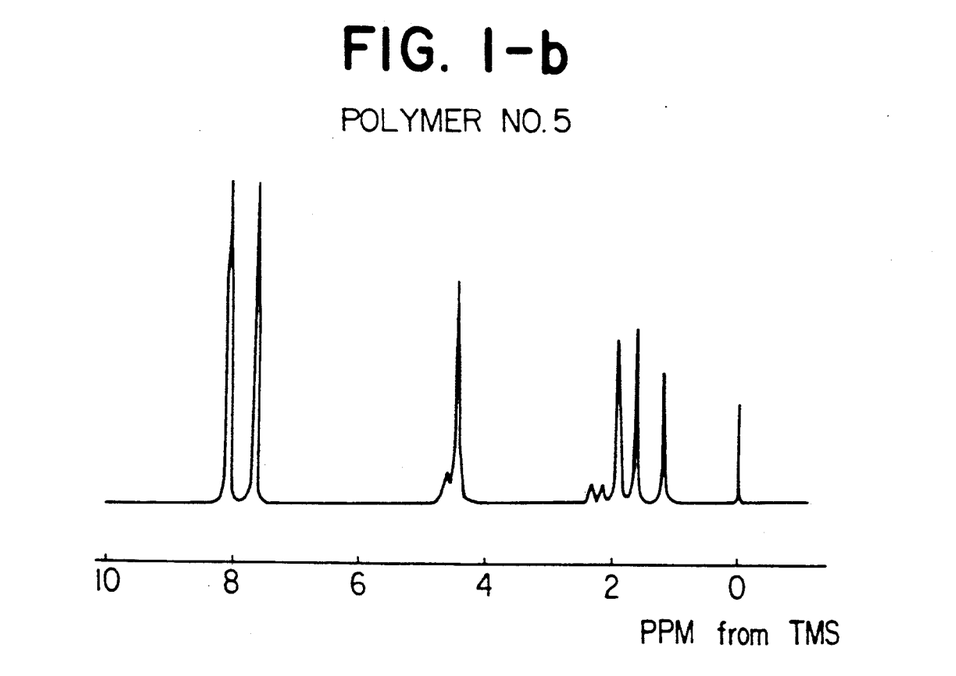
Figure 1C:
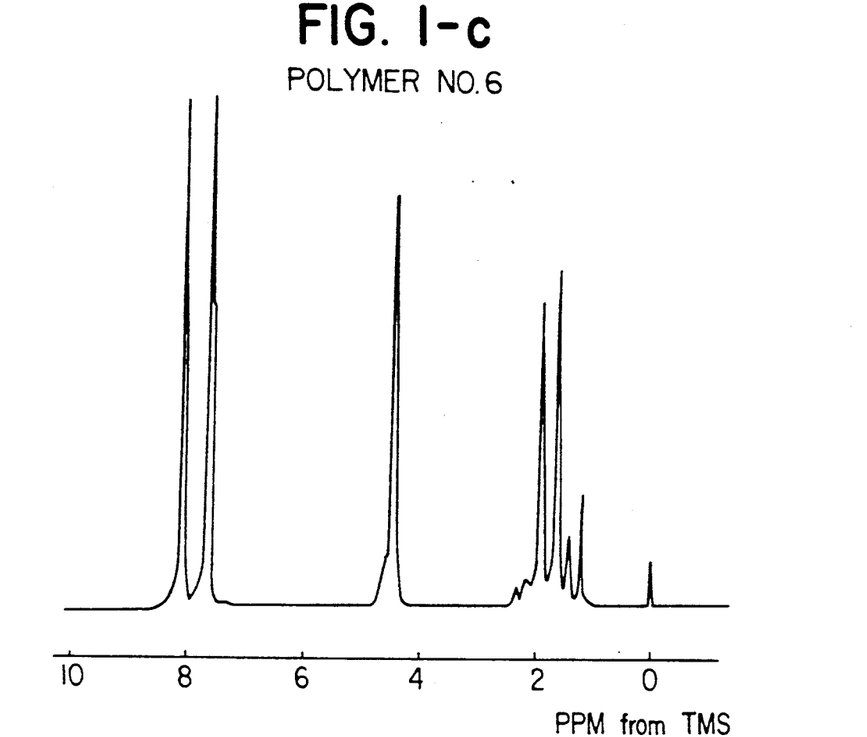
Figure 1D:
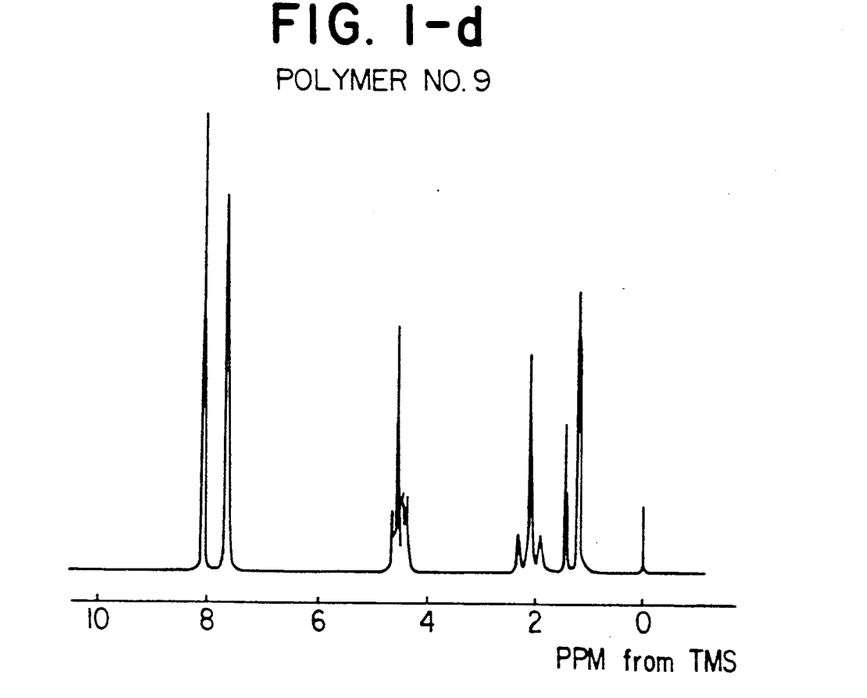
Figure 2:
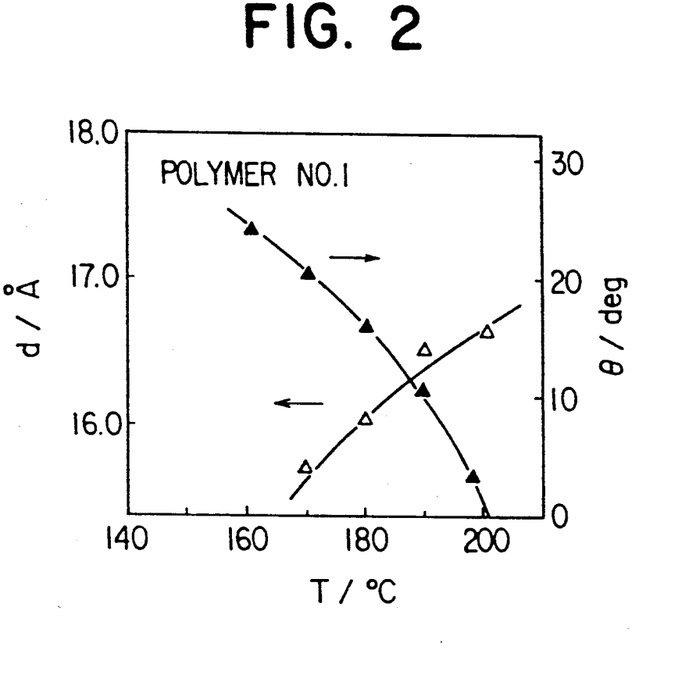
FIG. 2 shows the layer distance (d/Å) in the smectic C phase determined by X-ray diffractometry and the tilt angle of the molecules, in which the abscissae are temperatures.

The results of X-ray diffractometry of the Polymer No. 1 are shown in FIG. 2. A diffraction pattern indicating the presence of the smectic layer structure was observed. The spacing d reduces as the temperature was lowered. On the other hand, the tilt angle of the molecules constituting the smectic layer was increased as the temperature was lowered. It is apparent from these facts that the polymer had the smectic layer structure, that the orientation vector of the molecules constituting the smectic layer tilted and that an increase in the tilting angle was correlated with a reduction in the distance between the layers. Thus it is apparent that the polymer forms smectic C liquid crystals.

② Observation with polarizing microscope

Figure 3:
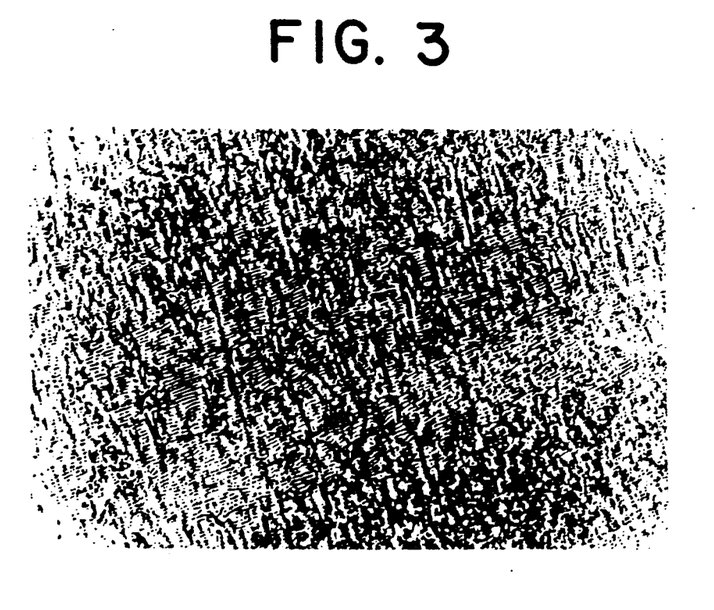
FIG. 3 is a polarizing photomicrograph of the polymer of the present invention, in which the retardation lines based on the chiral smectic C phase are shown.

A polarizing photomicrograph of the Polymer No. 8 taken at 160° C. is shown in FIG. 3. Clear retardation lines are observed to show distinctly that the polymer had the same spiral periodic structure as that of the cholesteric liquid crystals. Namely, it is apparent from the results of the X-ray diffractometry and polarizing photomicrography that the polymer was chiral smectic C liquid crystals, since it formed a smectic C structure and had the spiral structure observable with an optical microscope.

(3) Temperature and composition ranges for the chiral smectic C phase

① Determination of DSC

Figure 4A:
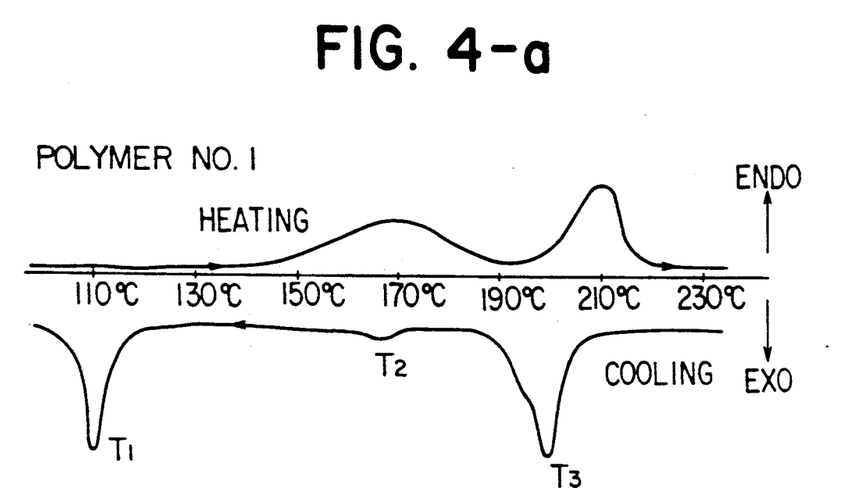
Figure 4B:
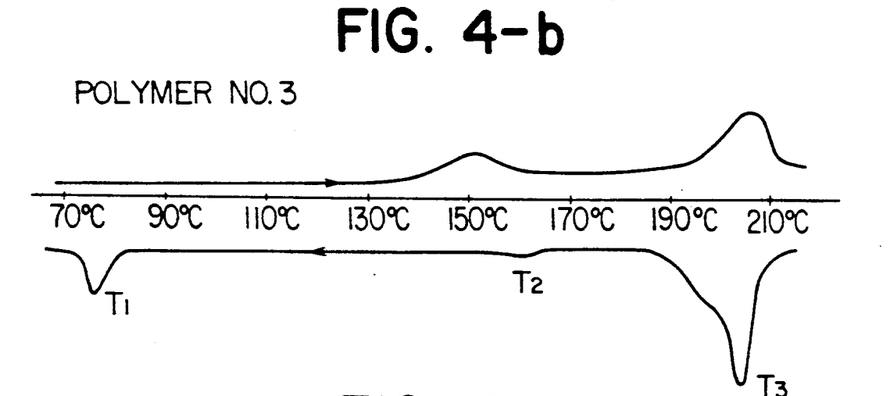
Figure 4C:
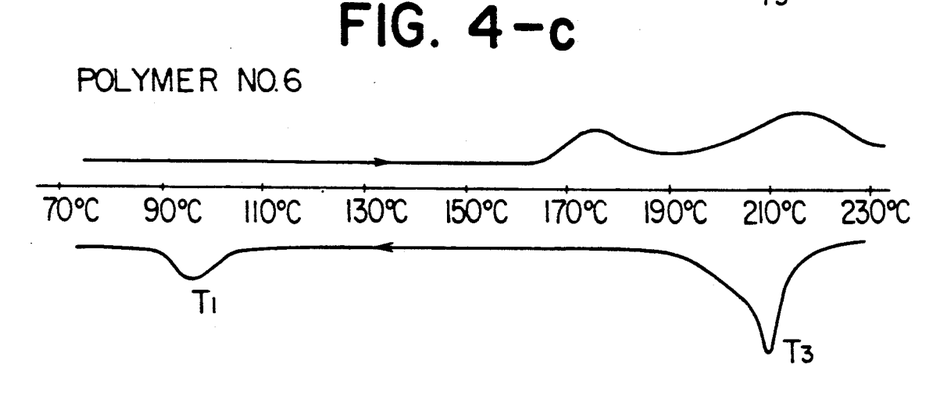

DSC thermograms of the Polymer Nos. 1, 3 and 6 are shown in FIGS. 4. In the cooling curves, a transition point $T_1$ from the crystal phase into the chiral smectic C liquid crystal phase, transition point $T_2$ from the chiral smectic C liquid crystal phase into the cholesteric liquid crystal phase or smectic A liquid crystal phase and transition point $T_3$ from the liquid crystal phase into the isotropic phase were observed. It is apparent from FIG. 3 that the polymer of the present invention forms a stable chiral smectic C phase in a wide temperature range and that it forms a cholesteric or smectic A phase at a higher temperature.

② Phase diagram

Figure 5:
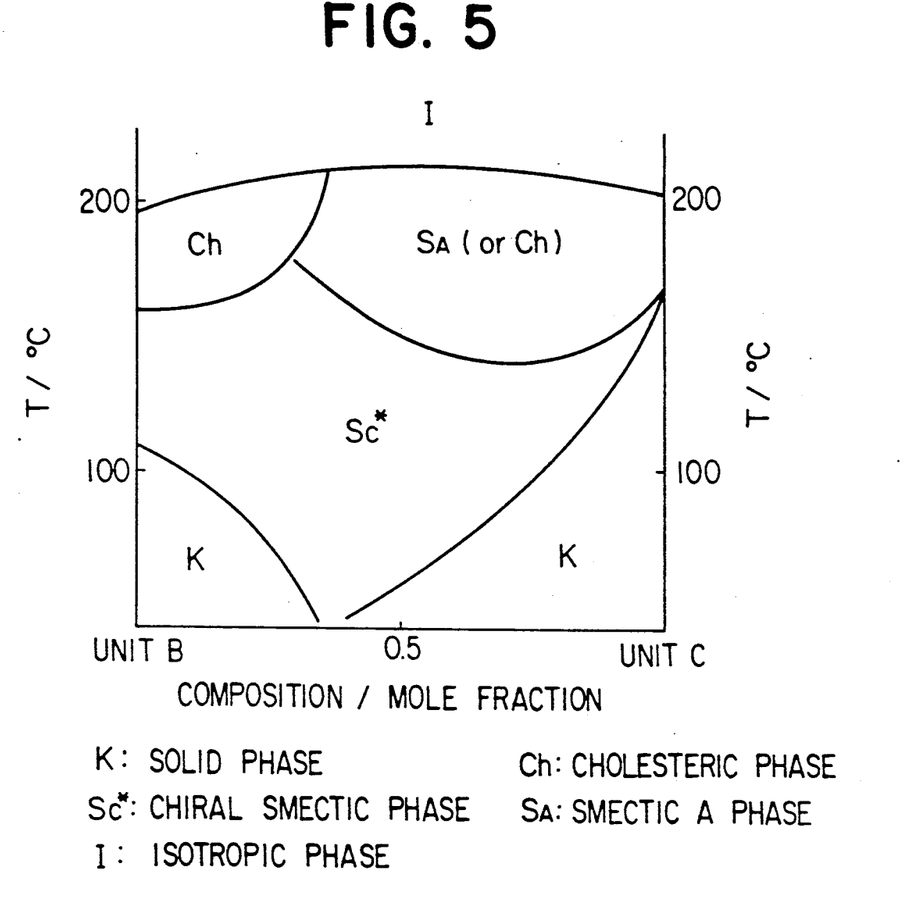
FIG. 5 is an example of the phase diagrams of the polymers of the present invention.

FIG. 5 is a phase diagram prepared from the DSC thermograms of the Polymer Nos. 1 to 7 and the results of the observation with a polarizing microscope. These polymers comprise units (B) derived from (S)-2-methyl-1,4-butanediol having an e.e. of 93% and units (C) derived from 1,6-hexanediol. It will be understood that the chiral smectic C phase was formed over a wide temperature range and in almost the whole range of the chiral units, i.e. the molar fraction of unit (B). The chiral smectic C phase was formed even in the composition range wherein the units (C) was close to 1.0, namely the chiral unit content is low, though the temperature range therefor was narrow. It thus clearly shows the characteristic feature of the polymer of the present invention, i.e. the formation of chiral smectic C liquid crystals over a quite wide composition range.

(4) Spiral pitch of chiral smectic C phase

Figure 6:
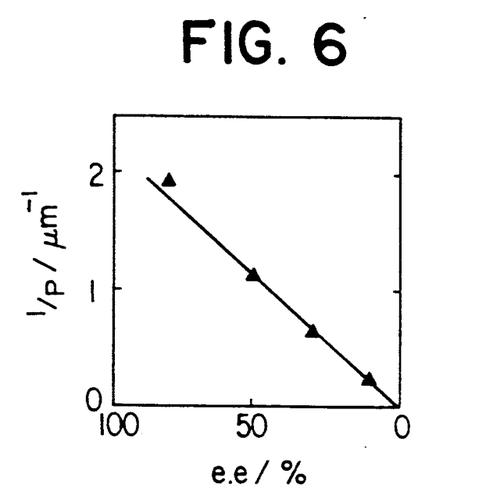
FIG. 6 shows the relationship between the spiral pitch of the chiral smectic C phase of the polymer of the present invention and the amount of the chiral component. The ordinates are the reciprocal numbers of the pitch lengths (μm) and the abscissae are the values of the enantiotropic excess (e.e.).

2-Methyl-1,4-butanediol having an e.e. of 80, 50, 30 or 10% was prepared by mixing (S)-2-methyl-1,4-butanediol having an e.e. of 93% with racemic 2-methyl-1,4-butanediol. Then chiral smectic C liquid crystal polyester was prepared from 2-methyl-1,4-butanediol thus prepared and diethyl biphenyl-4,4'-dicarboxylate by the process described in the above item (1) (Polymer Nos. 12, 13, 14 and 15). The spiral pitch P of each of the polymers thus obtained was determined from the retardation line distance d (d = P/2) observed with a polarizing microscope and the wavelength $\lambda_{max}$ ($\lambda_{max}$ = nPsin $\theta$) in the transmission spectrum. The results are shown in FIG. 6. It will be apparent from FIG. 6 that the spiral pitch of the chiral smectic C structure can be controlled by adjusting the amount of the chiral component of the polymer and that, therefore, the wavelength of the transmitted light can be suitably selected.

EXAMPLE 2

Figure 7:
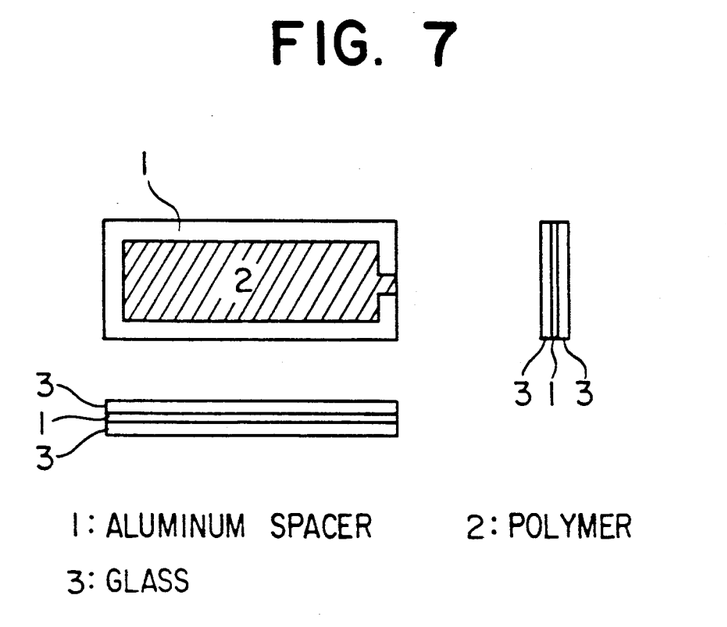
FIGS. 7 are a top view, a side view in the lengthwise direction and a side view in the widthwise direction of the optical filter used in the above-described Example of the present invention.
Figure 8:
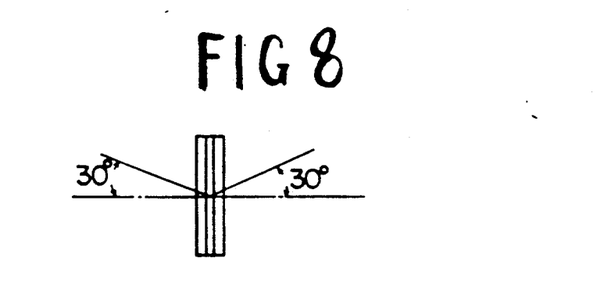
FIG. 8 shows the angle of the incident light in the optical filter used in the above-described Example of the present invention and angle of the transmitted light.

Preparation of optical filter 0.2 g of each of the four polymers prepared in Example 1-(4) was placed between two Pyrex glass plates in such a manner that the polymer was located at the center of the plate. A thickness controller comprising an aluminum film having a thickness of 20 μm was also placed between the plates. They were preheated on a bench press at 200° C. for 30 min and then pressed by slowly applying a pressure while the temperature was kept at that point. The product was taken out of the press, kept at a temperature of 150° to 180° C. for 1 h and cooled to obtain a sample shown in FIG. 7. A light was applied thereto at an angle of incidence of 30° as shown in FIG. 8 and the wavelength of the light transmitted through the filter was determined at an angle of 30° to obtain the results shown in Table 2.

TABLE 2

| Polymer No. | Wavelength in the transmission spectrum | |
|---|---|---|
| | Wavelength/nm | Color |
| 12 | 410 | purple |
| 13 | 620 | orange |
| 14 | 1090 | (infrared) |
| 15 | 2920 | (infrared) |

It will be understood, therefore, that the optical filter substantially comprising the polymer of the present invention is capable of selectively transmitting light of a specific wavelength, that the wavelength of the light transmitted can be suitably controlled by modifying the composition of the polymer containing the chiral component and that the wavelength range is very wide. Namely, the optical filter of the present invention is quite excellent in view of easiness of the preparation, wavelength selectivity and wideness of the wavelength range.

BRIEF DESCRIPTION OF THE DRAWINGS

FIGS. 1(a-d) show $^1$H-NMR spectra of the chiral smectic C liquid crystalline polyesters of the present invention, in which the abscissae are shift values (ppm from TMS).

FIGS. 4(a-c) show DSC thermograms of the polymers of the present invention.

What is claimed is:

1. A chiral Smectic C liquid crystalline polyester consisting essentially of structural units (A), (B) and (C) of the following formulae:

40 to 60 molar %. (A)

-continued 1 to 60 molar % (B)

which is optically active and wherein R represents an alkyl group having 1 to 3 carbon atoms, and $$-O(CH_2)_nO- \quad \text{0 to 59 molar \%} \quad (C)$$

wherein n represents an integer of 2 to 10.

2. A chiral smectic C liquid crystalline polyester according to claim 1 wherein the structural unit (A) content is 45 to 55 molar %, the structural unit (B) content is 10 to 50 molar % and the structural unit (C) content is 5 to 50 molar %.

3. A chiral smectic C liquid crystalline polyester according to claim 1 wherein the difference in amount between the R-isomer and S-isomer of the structural unit (B) is at least 1%.

4. A process for selectivity transmitting light of a specific wavelength comprising filtering light through a filter of the chiral smectic C liquid crystalline polyester of claim 1.

5. A process in accordance with claim 4 wherein said chiral smectic C liquid crystalline polyester filter is provided in film form.

* * * * *